(12) United States Patent
Mace et al.

(10) Patent No.: US 7,634,916 B2
(45) Date of Patent: Dec. 22, 2009

(54) STIFFENER FOR LOW PRESSURE COMPRESSOR FOR AN AIRCRAFT ENGINE

(75) Inventors: Jerome Mace, Melun (FR); Claude Lejars, Draveil (FR); Pierre-Yves Maillard, Chapelle Gauthier (FR); Francois Buffenoir, Pessac (FR); Thierry Niclot, Savigny sur Orge (FR)

(73) Assignee: Snecma, Paris (FR)

( * ) Notice: Subject to any disclaimer, the term of this patent is extended or adjusted under 35 U.S.C. 154(b) by 421 days.

(21) Appl. No.: 11/172,804

(22) Filed: Jul. 5, 2005

(65) Prior Publication Data

US 2007/0039309 A1   Feb. 22, 2007

(30) Foreign Application Priority Data

Jul. 5, 2004   (FR) .................................. 04 51437

(51) Int. Cl.
*F02C 7/00*   (2006.01)
(52) U.S. Cl. ...................... 60/796; 415/214.1
(58) Field of Classification Search ............. 60/39.091, 60/226.1, 779, 796; 415/214.1, 215.1; 244/119, 244/120, 129.4, 129.5, 132, 133
See application file for complete search history.

(56) References Cited

U.S. PATENT DOCUMENTS

| | | | | |
|---|---|---|---|---|
| 1,885,406 A | * | 11/1932 | Bechereau | .................. 244/119 |
| 3,861,139 A | * | 1/1975 | Jones | .................. 60/226.1 |
| 5,409,349 A | | 4/1995 | Kulak et al. | |
| 5,704,207 A | * | 1/1998 | Jensen et al. | ............. 244/129.4 |
| 6,145,300 A | | 11/2000 | Romani | |
| 6,173,566 B1 | * | 1/2001 | Boeck | ...................... 60/226.1 |
| 6,428,269 B1 | | 8/2002 | Boratgis et al. | |
| 2004/0063504 A1 | | 4/2004 | Bouchy et al. | |

FOREIGN PATENT DOCUMENTS

EP   0 523 935 A1   1/1993
EP   1 403 486 A2   3/2004

* cited by examiner

*Primary Examiner*—Louis J Casaregola
(74) *Attorney, Agent, or Firm*—Oblon, Spivak, McClelland, Maier & Neustadt, L.L.P.

(57) ABSTRACT

Unbalanced mass effects can occur at the low pressure compressor (5) of an aircraft engine.

Stiffeners (20) are proposed to increase the stiffness of the assembly and therefore reduce possible cracks due to accidental unbalanced masses, one end (22) of the stiffener can be fixed to the engine casing (7) at the structural arm (10), and the other end (32) can be fixed to the compressor (5), preferably at the upstream face of the third guide vane (RD3).

Advantageously, the stiffeners (20) are made of two parts fixed to each other; their manufacturing is optimized to limit the additional weight due to their presence.

15 Claims, 3 Drawing Sheets

STIFFENER FOR LOW PRESSURE COMPRESSOR FOR AN AIRCRAFT ENGINE

TECHNICAL DOMAIN

This invention relates to aircraft engines and particularly the low pressure compressor part of these engines.

More particularly, the invention relates to means of reducing effects subsequent to vibrations and their transmission between the compressor and the shell surrounding the compressor.

STATE OF PRIOR ART

As shown diagrammatically in FIG. 1, a jet engine 1 for an aircraft comprises principally a shell 2 or a circular envelope, inside which different components of the engine are located. In particular, considering the air displacement direction (opposite to the forward direction of the engine, in other words from left to right in the figure), fan blades 3 are located at the inlet to the shell 2 coupled to a rotating shaft 4. There are then the different compression stages connected to the shaft 4, including the first compressor 5; followed by the different elements of the engine including the turbine 6.

Air enters into the shell 2 where it is entrained by the blades 3. Most flows through the part of the shell 2 external to the engine elements 4, 5 to create propulsion. Part of the air is drawn in through the first compressor 5 and directed to the turbine 6 through other components making up the engine.

The first compressor 5 is thus a low pressure compressor comprising a moving part and a fixed part fixed to the engine casing 7; more particularly and as is well known, the compressor is composed of an alternation of blades 8 coupled to the shaft 4 and therefore rotating, and guide vanes 9 coupled to the fixed part of the compressor 5 in order to straighten the air flow. It receives air directly from the outside and operates at a temperature usually between −50 and +50° C.

Stiffener arms 10 are also fixed to the shell 2 and to the casing 7 that holds the compressor 5 in place, to fix the assembly to the shell 2 and eliminate air turbulence caused by passage of the blades 3.

Finally, monitoring devices are provided to detect abnormal vibrations of the different parts between themselves, that may for example originate from a slight unbalance; conventionally, alarms are triggered as soon as the vibration reaches 2 ips (namely 50.8 mm/s).

The dimensions of one know example of this type of engine are such that the diameter of the shell 2 is of the order of 4 m while the total length of the shaft 4 is of the order of 9 m, and the weight of the assembly is 9 t. Furthermore, the distance separating the inlet to the low pressure compressor 5 and the stiffener arm 10 in this case is more than 1 m; the compressor 5 is cantilevered.

A minimum unbalanced mass located on the output side of the shaft 4, for example at the turbines 6, may be amplified at the low pressure compressor 5 and reach critical vibration thresholds. In particular, the specifications of some engines can enable a vibration of less than 2 ips at the intermediate casing 7 of the engine; operating experience has shown that this vibration on the casing 7 can be as high as 25 ips at the compressor 5 following some defects. This can have consequences on the integrity of the compressor, possibly with the appearance of cracks on its envelope particularly at the third and fourth guide vanes. An additional detection of these phenomena is not sufficient and does not provide any solution to overcome the problem.

However, it is unacceptable to modify the geometry of existing engines due to the complexity of the engines, the long time necessary for certification processes, etc. Similarly, requirements related to the weight and strength of parts used in an aircraft prevent the use of different materials, for example to stiffen the engine elements concerned. Furthermore for engines already commercialized, it is desirable to find a solution that can be easily adapted without making it necessary to make a major modification to the aircraft.

PRESENTATION OF THE INVENTION

One of the various advantages of this invention is that it overcomes the unbalanced mass problem that can occur at the low pressure compressor without modifying exiting engines. In particular, the invention relates to means of stiffening the assembly supporting the low pressure compressor without modifying installed engines and particularly without changing the modular breakdown of the compressor assembly.

According to one of its aspects, the invention relates to a stiffener that is positioned between the low pressure compressor and the casing, and preferably at the structural arm fixed to the shell, and at the upstream face of the third guide vane of the low pressure compressor.

The stiffener is preferably made of aluminum, including openings in order to limit the weight increase inherent to the presence of additional parts on the engine. The stiffener is advantageously composed of two parts that are fixed to each other, preferably by means of screws/nuts with rivets, to facilitate the placement of a modular compressor in the shell without changing the predetermined assembly method.

Advantageously, several stiffeners are used, for example five, distributed uniformly around the periphery of the compressor.

The invention also relates to a method of increasing the stiffness of the low pressure compressor for an aircraft engine using triangulation by means of a stiffener.

BRIEF DESCRIPTION OF THE DRAWINGS

Other characteristics and advantages of the invention will become clear after reading the detailed description given below. The figures in the attached drawings will undoubtedly help to better understand the invention, but are only given for guidance and are in no way restrictive.

DETAILED PRESENTATION OF PARTICULAR EMBODIMENTS

Figure 1:
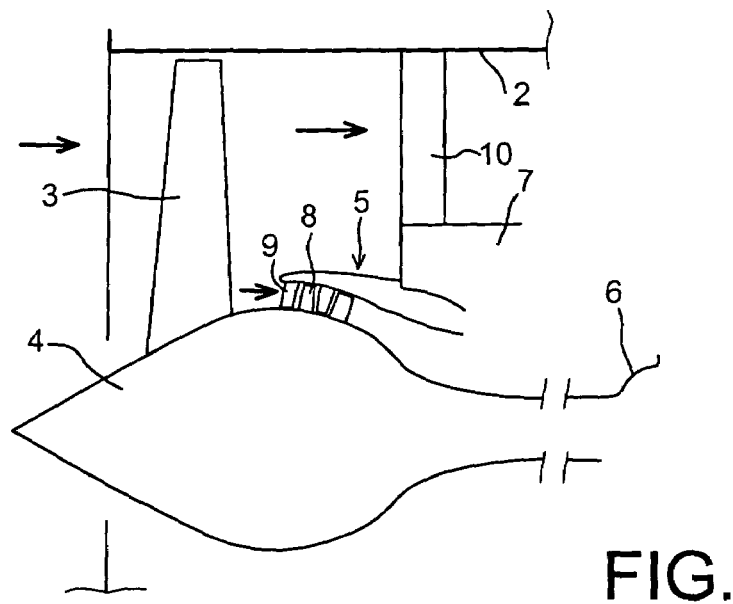
FIG. 1, already described, presents a diagram partially illustrating operation of an existing aircraft engine.

As already described with reference to FIG. 1, the low pressure compressor 5 of an engine 1 for an aircraft is located around the engine shaft 4 and inside the shell 2.

Figure 2:
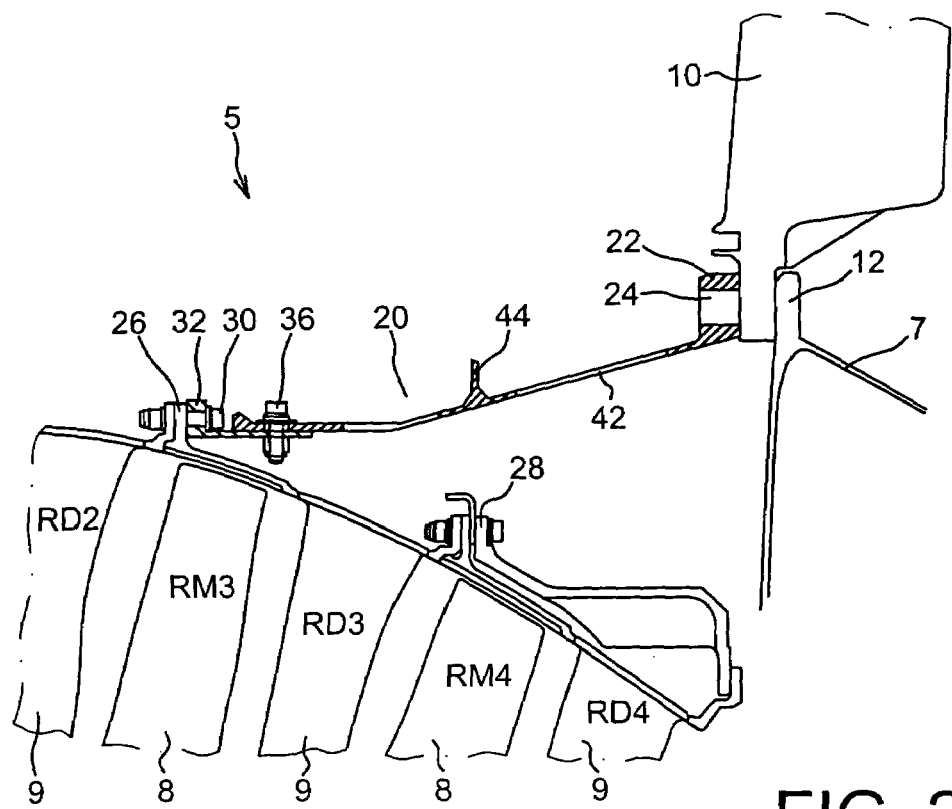
FIG. 2 shows an enlargement of a detail in FIG. 1, also comprising a stiffener conform with a preferred embodiment of the invention.

As is clear in FIG. 2, the low pressure compressor 5 comprises a sequence of guide vanes 9, typically referred to as RD in the aeronautical field, the first guide vane RD1 being located at the inlet of the compressor 5, in other words at the side through which air enters into the compressor; there are several guide vanes, the number depending on the engine range, there are four guide vanes RD1 to RD4 in this context. There is a blade 8 or rotating wheel, fixed to the shaft 4 between each two adjacent guide vanes 9. The first rotating wheel RM1 is located on the downstream side of the first guide vane RD1, in other words between the first guide vane RD1 and the second guide vane RD2, and so on; there are four blades RM1 to RM4 in this context.

The structural arm 10 used to hold the low pressure compressor 5 and the engine assembly within the shell 2 is conventionally installed on the downstream side of the last guide vane RD4, in other words connected to the intermediate casing 7 separating the low pressure compressor 5 and the high pressure module, through a set of flanges 12, at the end of the low pressure compressor 5 itself.

For an engine of the type with the dimensions specified above, the distance separating the input end of the low pressure compressor 5 from the anchor point of the structural arm 10 is of the order of 1.20 m, the thickness of the wall of the compressor 5 supporting the guide vanes 9 being 4 mm or even less.

Depending on the usage conditions of the engine, and particularly when the aircraft on which it is installed lands and takes off frequently thus creating high stresses on the mechanical parts, it may be desirable to increase the stiffness of the assembly consisting of the low pressure compressor 5, the casing 7, the shell 2 and the stiffener arms 10, in order to increase its tolerance to vibrations of the shaft 4 and the different parts 3, 8, . . . that are fixed to it, and the unbalanced mass thus generated. In particular, the wall of the fixed part of the compressor 5 is fragile, particularly at the fourth guide vane RD4.

The invention thus relates to a method of increasing the stiffness of the assembly by its triangulation; at least one stiffener 20 is fixed to the casing 7 and the envelope of the compressor 5 to limit cantilever effects inherent to the construction and operation of the compressor and the engine.

Since weight problems are critical in aeronautics, it is desirable that each stiffener should be as lightweight as possible; in particular, it is desirable to choose the material so as to reduce the weight of the structure. Although titanium could be used to make stiffeners 20, it has thus been demonstrated that aluminum is a preferred solution; optimization of the structure will enable an aluminum stiffener 20 to achieve the required results, although this material is very lightweight.

Advantageously, a plurality of stiffeners 20 is used, each of the stiffeners 20 being distributed uniformly around the compressor axis. This enables a better distribution of tension forces and therefore provides a means of overcoming the effects of unbalanced masses for all directions, while not unacceptably complicating manufacturing and assembly of the stiffeners 20.

Figure 3:
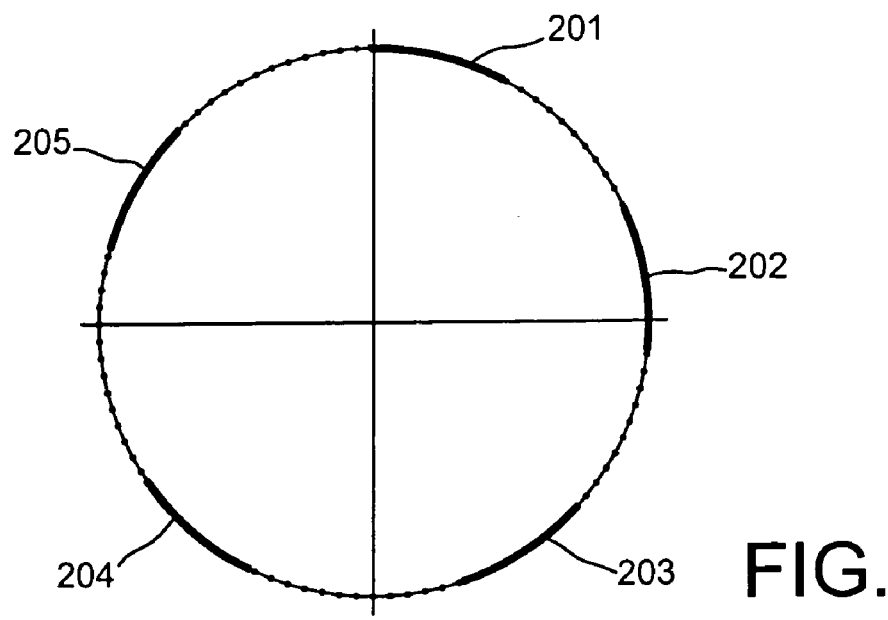
FIG. 3 shows the preferred distribution of stiffeners around the compressor.

In particular, the presence of five stiffeners 201-205 each extending over an angle of about 30° and uniformly distributed proved to be sufficient to reduce vibrations to the order of 10-15 ips on large engines; the preferred distribution is shown in FIG. 3. Therefore the general shape of the stiffeners is like a trapezium, preferably uniform, the two opposite parallel sides being fixed to the compressor 5 and to the casing 7. The curvature inherent to positioning over a 30° angle of the stiffener 20 remains minimum due to the dimensions involved and does not imply any specific or complicated manufacturing conditions. In particular, the length of the side of the stiffener that is connected to the compressor 5 for an engine like that described above is of the order of 350 to 500 mm, for example 435 mm, the length of the side of the stiffener connected to the casing is of the order of 240 to 350 mm, for example 255 mm, for an average thickness of 4 mm to 10 mm.

This choice is also explained particularly from the point of view of the fasteners, as will become clear later. It is preferable if all stiffeners 201-205 are identical, for economies of scale and for ease of installation. The choice of five stiffeners 20 offers an additional advantage due to symmetry in the positioning of attachment means between the stiffener 20 and the compressor 5 and/or casing 7, and considering holes enabling the passage of screws present in the compressor and the casing (that can be identified by their order number in FIG. 3). In this case illustrated in FIG. 2 and presented in more detail below, each stiffener 20 is fixed to the intermediate casing 7 by six screws, and to a flange present between the second and third guide vanes RD2, RD3 by seven screws. Other solutions are possible.

To avoid problems inherent to the circulation of a large air flow between the shell 2 and the compressor 5, it is desirable to fix the stiffener 20 as close as possible to the axis, while assuring triangulation. To achieve this, it is recommended that the stiffener should be fixed at the structural arm 10. Since attachment means 12 are already present on the casing 7 in order to fix the structural arm 10 to them, it is desirable that the stiffener should be anchored at this level. Advantageously, attachment means 24 in the form of holes are arranged on this first side 22 of the stiffener 20 fixed on the casing 7 (as explained above, six in the case of five stiffeners 201-205), so that conventional attachment screws can be used to connect the stiffener 20 and the structural arm 10. Another possibility relates to the presence of attachment means 24 that could for example be drilled at the time of assembly; this allows precise adjustment even if alignment with the existing holes in the flange 12 is not optimized at the time of positioning.

It is also desirable that existing engines should be modified as little as possible without adding additional parts. A low pressure compressor 5, unlike the illustrative diagram in FIG. 1, already comprises many elements around its periphery that could be used to fix stiffeners 20 to them as shown in FIG. 2. In particular, in a modular compressor, modules or stages each comprising a guide vane 9 are joined end to end by flanges positioned between each stage of the compressor. In particular, the flange 26 positioned between the guide vanes RD2 and RD3 could be used to fix the stiffener 20. This flange 26 has the advantage of enabling triangulation without causing any major problems with the other elements of the engine; for example, although the flange 28 located on the upstream side of the guide vane RD4 makes it possible to make a shorter guide vane, it will cause assembly difficulties due to the different elements of the engine (not shown) that are already fixed to it; the first flange (not illustrated) does not enable optimum triangulation when the stiffener 20 is connected to the level 24 of the structural arm 10. The length between the first and second side of the stiffener 20 thus located between the flange 12 and the flange 26 is of the order of 240 to 300 mm, and for example 265 mm.

Therefore, each stiffener 20 is advantageously fixed at one of its ends to the flange 26 at the upstream face of the guide vane RD3, preferably by screws 30. The stiffener then has holes 34 on this second side 32 (for example seven holes in the embodiment presented above), or other attachment means as specified for the first side 22. The screws used for each of these sides 22, 32 are conventional in aeronautics.

Furthermore, the dimensions of the shell 2 and the stages of the compressor 5 are such that the assembly method has been defined precisely so as to minimize problems due to transport and assembly. In particular, the first step is to assemble each stage of the modular compressor 5; the shell 2 is fixed to the casing 7 independently by structural arms 10.

Therefore, it is preferable to make each stiffener 20 in two parts that will then be fixed together non-removably, to avoid modifying the existing assembly procedure while enabling efficient triangulation. Therefore in this respect, the stiffener 20 comprises a first part or a back stiffener 20R, that contains the fist side 22 of the stiffener with its attachment means 24, and a second part 20F, or front stiffener containing the second side 32. The two parts 20R, 20F are fixed to each other by any known means and preferably by screws 36; screws/nuts with rivets are advantageously used to simplify the assembly, for example made of Inconel® or a Z10 alloy, including alloys frequently used in aeronautics for this range of temperatures (the temperature at this location oscillates between −50 and +50° C.) and tension.

Figure 4:
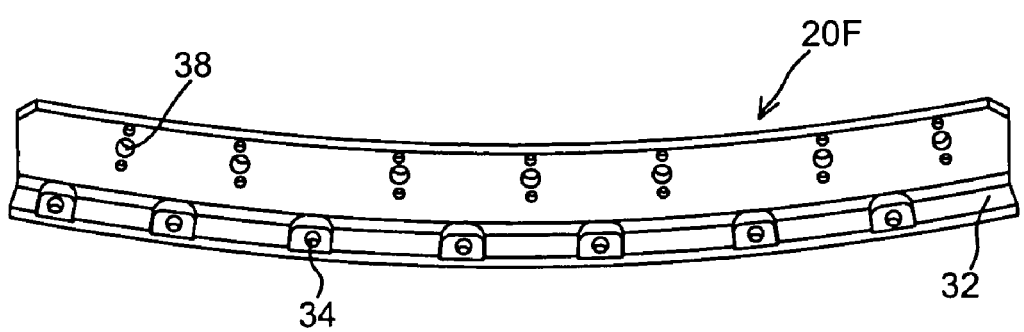
FIG. 4 shows a preferred embodiment of the front part of a stiffener according to the invention.
Figure 5:
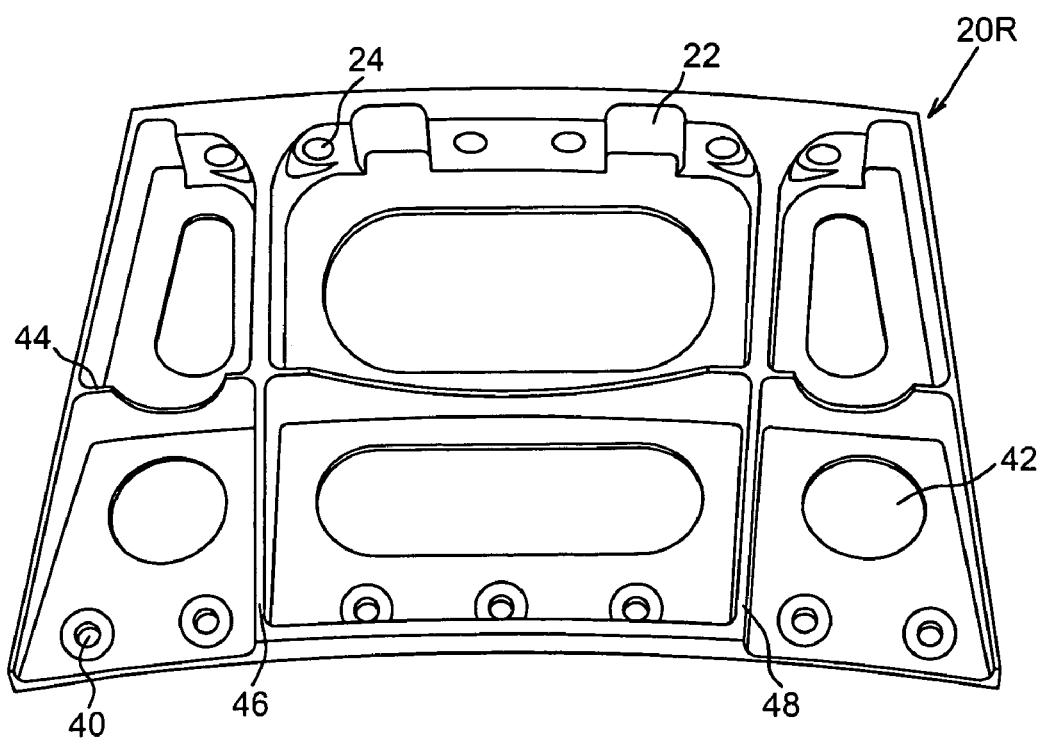
FIG. 5 shows a preferred embodiment of the back part of a stiffener according to the invention.

Models have been produced of the second part 20F preferably in the form of an L (see FIG. 4). The small side comprises the attachment means 34 for the flange 26 (in other words it corresponds to the second side 32 of the stiffener 20) and its width is of the order of 15 to 50 mm, preferably 40 mm for a maximum length of the second side equal to 435 mm; the large side is oriented at an angle equal to approximately 90°, with a width between 40 and 75 mm, for example 60 mm to decrease for example to a length of 415 mm and it includes holes 38, advantageously seven, that will be used by connecting screws 36 between the first and second parts of the stiffener 20. This second part 20F is advantageously fixed to the flange 26 of the compressor 5 when putting the stiffener 20 into place, during assembly of the different modules and before insertion in the shell 2.

The back stiffener 20R has a more complex shape and represents the largest part of the stiffener 20, in terms of dimensions. Preferably, it has an approximately trapezoidal shape, around the surface of a truncated cone as specified above (with reference to FIG. 3). The trapezium is preferably a regular isosceles trapezium, in other words the non-parallel sides of the trapezium are symmetric. The large side of the trapezium is advantageously connected to the front stiffener 20F, and therefore also has seven holes 40 for the connecting screws 36 over a length of the order of 350 to 450 mm, for example 415 mm; when the compressor is being assembled, it is connected to the front stiffener 20F once the compressor 5 is in place. Due to the L shape of the front stiffener 20F, the connection between the two parts of the stiffener 20 can be made along a direction perpendicular to the axis of the shell 2, which simplifies the maneuver.

The small side of the trapezium of the first part 20R or the first side 22 of the stiffener 20 with a length of between 240 and 350 mm, for example of the order of 255 mm, and at a distance of about 200 to 260 mm, for example 240 mm, from the large side, may be fixed directly to the casing 7 though holes 24 before attachment of the compressor 5 to which the front stiffener 20F was fixed onto the flange 12 of the casing 7.

The geometry of the back stiffener 20R is also preferably optimized to minimize its weight. Thus, it is desirable that the trapezium has parts 42 with openings delimited by stiffening parts 44, 46, 48. In particular for aluminum, it is desirable that a protuberance 44 should be designed parallel to the parallel sides of the trapezium and approximately at their center to absorb the forces. For example, this protuberance may be 1.5 to 5 mm thick and 20 to 50 mm high, for example 30 mm, along the entire length of the crossing through the trapezium. Two protuberances 46, 48 perpendicular to the central protuberance 44 may also pass through the trapezium in the direction of its height, preferably at a distance of 150 to 220 mm, for example 185 mm, and symmetrical about the median of the trapezium.

Furthermore, models have shown that for optimum assembly, it is desirable for the back stiffener 20R to have a folding line located approximately at the middle between the central stiffener 44 and the side at which the connection will be made with the front stiffener 20F. The angle created by this fold is of the order of 10-20°, preferably 15° (see FIG. 2).

Therefore, the stiffener 20 is an easy element to make and is composed of an inexpensive and lightweight material. This simple solution has proved its capacity to limit negative effects or even hardware damage caused by unbalanced masses at the low pressure compressor 5, consequently increasing safety. The placement of stiffeners 201-205 was optimized to not cause any additional maintenance costs.

Although preferably described for use on large engines for which these problems can become critical considering the dimensions and weight of the jet engine, this solution may be applicable to any other double flow and/or double body engine with a similar architecture; modeling of the dimensions of parts and locations of attachment means will enable adaptation of a stiffener according to the invention.

The invention claimed is:

1. A stiffener to stiffen a low pressure compressor part of an aircraft engine, said stiffener comprising:
    a four-sided element having two pairs of opposite sides, a first pair having straight sides of equal length and a second pair having curved sides of unequal length with a smaller side and a larger side, the smaller side comprising first attachment means for connecting the stiffener to a casing of said aircraft engine, the larger side comprising second attachment means for connecting the stiffener to a low pressure compressor of said aircraft engine, the first and second sides being curved about a longitudinal axis of said aircraft engine,
    wherein the four-sided element is made of two independent parts configured to be fixed together, a first part comprising the smaller side, and a second part comprising the larger side.

2. A stiffener according to claim 1, wherein said four-sided element is made of aluminum.

3. A stiffener according to claim 1, wherein a distance along a normal separating the smaller side and the larger side is of the order of 265 mm.

4. A stiffener according to claim 1, wherein the smaller side has a length of the order of 255 mm and the larger side has a length of the order of 435 mm.

5. A stiffener according to claim 1, wherein the first and second attachment means are holes.

6. A stiffener according to claim 5, wherein the first attachment means are composed of six holes and the second attachment means are composed of seven holes.

7. A stiffener according to claim 1, wherein the second part has an approximately L shaped cross-section.

8. A stiffener according to claim 7, wherein a distance separating the smaller side from side of the first part opposite the smaller side along a normal is of the order of 240 mm.

9. A stiffener according to claim 1, wherein each of the first and second parts comprises fixing means to fix the two parts together on a side opposite the smaller and larger sides respectively.

10. A stiffener according to claim 9, wherein the fixing means are composed of holes and screws to fix the two parts through the said holes.

11. A stiffener according to claim 1, wherein said smaller side is in a range from 240 mm to 350 mm, and said larger side is in a range from 350 mm to 500 mm.

12. An aircraft engine comprising a casing, a low pressure compressor and a plurality of identical stiffeners connecting said casing to said low pressure compressor, each of said stiffeners comprising:

a four-sided element having two pairs of opposite sides, a first pair having straight sides of equal length and a second pair having curved sides of unequal length with a smaller side and a larger side, the smaller side comprising first attachment means for connecting the stiffener to a casing of said aircraft engine, the larger side comprising second attachment means for connecting the stiffener to a low pressure compressor of said aircraft engine, the first and second sides being curved about a longitudinal axis of said aircraft engine.

13. An aircraft engine according to claim 12, wherein said stiffeners are uniformly distributed around said longitudinal axis of said aircraft engine.

14. An aircraft engine according to claim 13, wherein said stiffeners are a total of five in number.

15. An aircraft engine according to claim 14, wherein each of said stiffeners extend over an angle of about 30° around said longitudinal axis of said aircraft engine.

* * * * *